United States Patent [19]
Dominka

[11] Patent Number: 5,494,254
[45] Date of Patent: Feb. 27, 1996

[54] ROTARY SHUT OFF VALVE

[75] Inventor: John Dominka, Sterling Heights, Mich.

[73] Assignee: JDL Enterprises, Sterling Heights, Mich.

[21] Appl. No.: 300,647

[22] Filed: Sep. 6, 1994

[51] Int. Cl.$^6$ .......................... H16K 31/122; F16K 31/54
[52] U.S. Cl. .................. 251/58; 74/30; 74/89.17; 92/136; 251/229; 251/250; 251/304
[58] Field of Search .................. 74/25, 29, 30, 74/89, 89.12, 89.17; 92/136; 251/58, 250, 229, 248, 304, 309; 137/15, 315

[56] References Cited

U.S. PATENT DOCUMENTS

| | | | |
|---|---|---|---|
| 654,009 | 7/1900 | Kittinger et al. | 251/250 |
| 3,056,573 | 10/1962 | Matheson et al. | 251/250 |
| 3,104,862 | 9/1963 | Pearson et al. | 251/250 |
| 3,128,793 | 4/1964 | Schou | 251/250 |
| 3,199,835 | 8/1965 | Freed | 251/309 |
| 3,218,024 | 11/1965 | Kroekel | 251/58 |
| 3,314,644 | 4/1967 | Dwyer, et al. | 251/309 |
| 3,338,140 | 8/1967 | Sheesley | 251/250 |
| 3,710,992 | 1/1973 | Hoffmann | 222/554 |
| 3,771,551 | 11/1973 | John | 137/486 |
| 3,897,933 | 8/1975 | Christenot | 251/309 |
| 4,087,074 | 5/1978 | Massay et al. | 251/58 |
| 4,225,110 | 9/1980 | Akkerman et al. | 251/58 |
| 4,436,280 | 3/1984 | Geisow | 251/229 |
| 4,520,994 | 6/1985 | DeWald | 251/58 |
| 4,700,924 | 10/1987 | Nelson et al. | 251/58 |
| 4,905,967 | 3/1990 | Satzke | 251/250 |
| 5,002,212 | 3/1991 | Tervo | 251/248 |

*Primary Examiner*—George L. Walton
*Attorney, Agent, or Firm*—Young, MacFarlane & Wood

[57] ABSTRACT

A rotary flow control valve including a valve spool which is rotated back and forth to move a port in the valve spool into and out of alignment with the main fluid passageway of the valve to selectively open and close the valve. The spool has a pinion gear at each end of the spool and each pinion gear is engaged by a pair of racks with the racks in a pair moving at any given time in opposite directions. Each rack is constituted by spaced rack teeth formed in the side wall of a piston slidably mounted in a cylinder bore in the valve body, and the rotation of the valve spool is achieved by selective routing of pressurized fluid to the cylinder bores containing the pistons defining the racks.

11 Claims, 4 Drawing Sheets

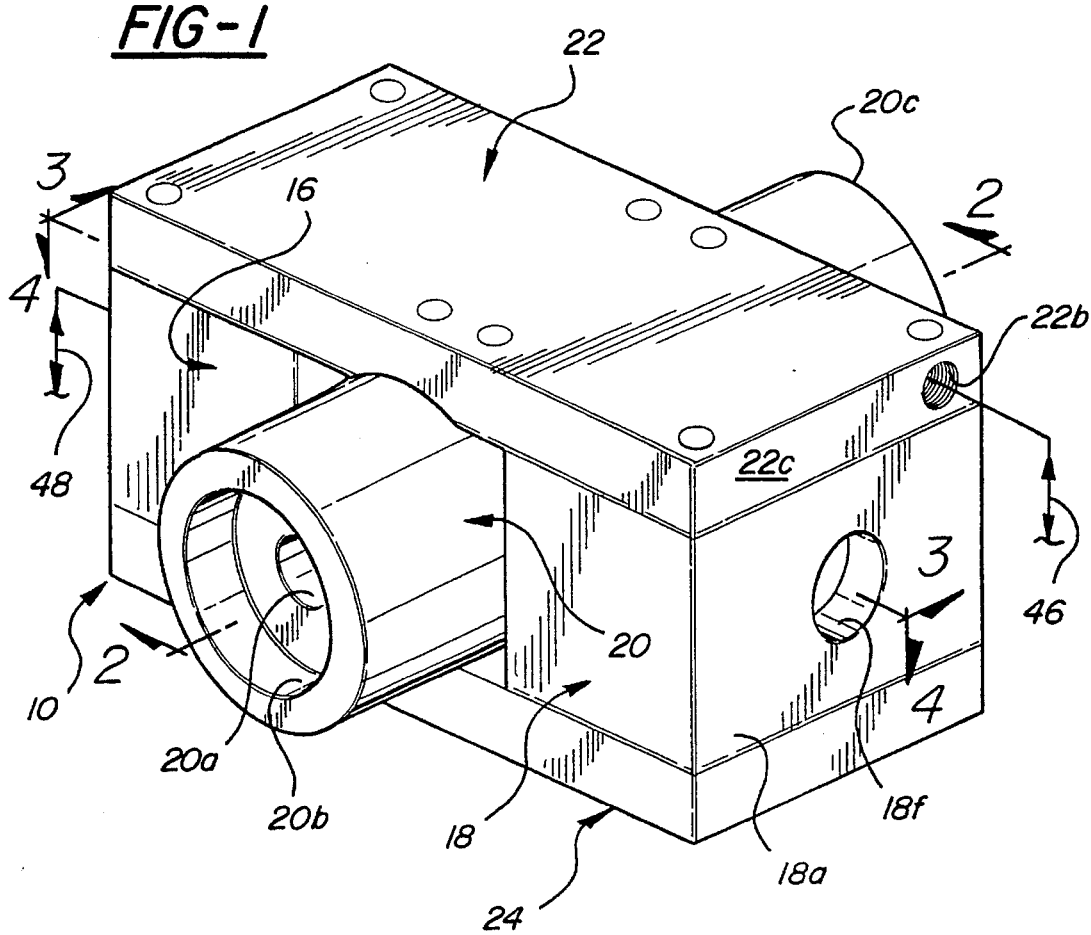
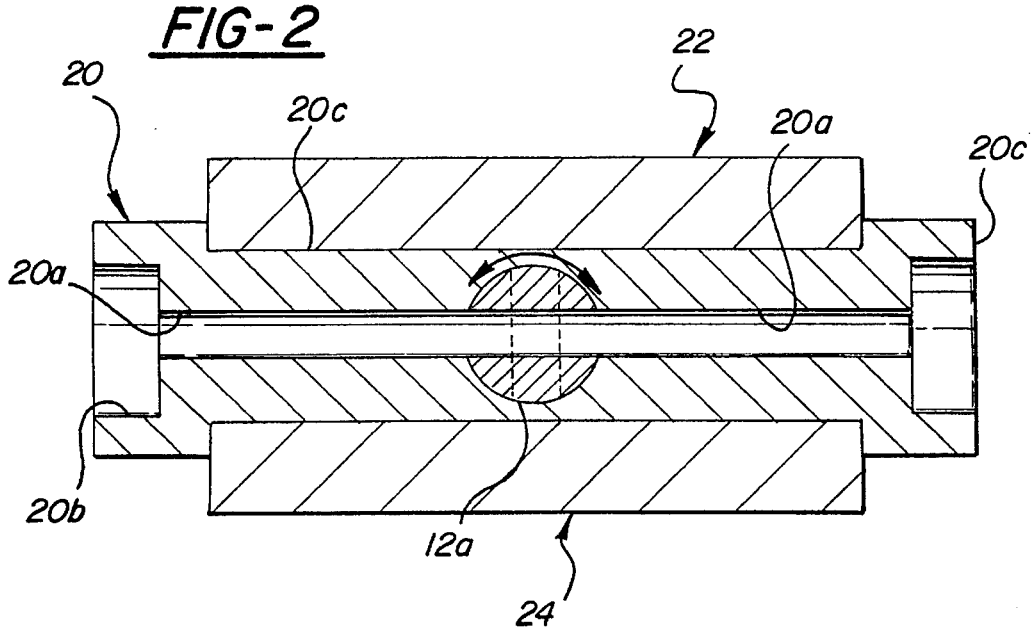

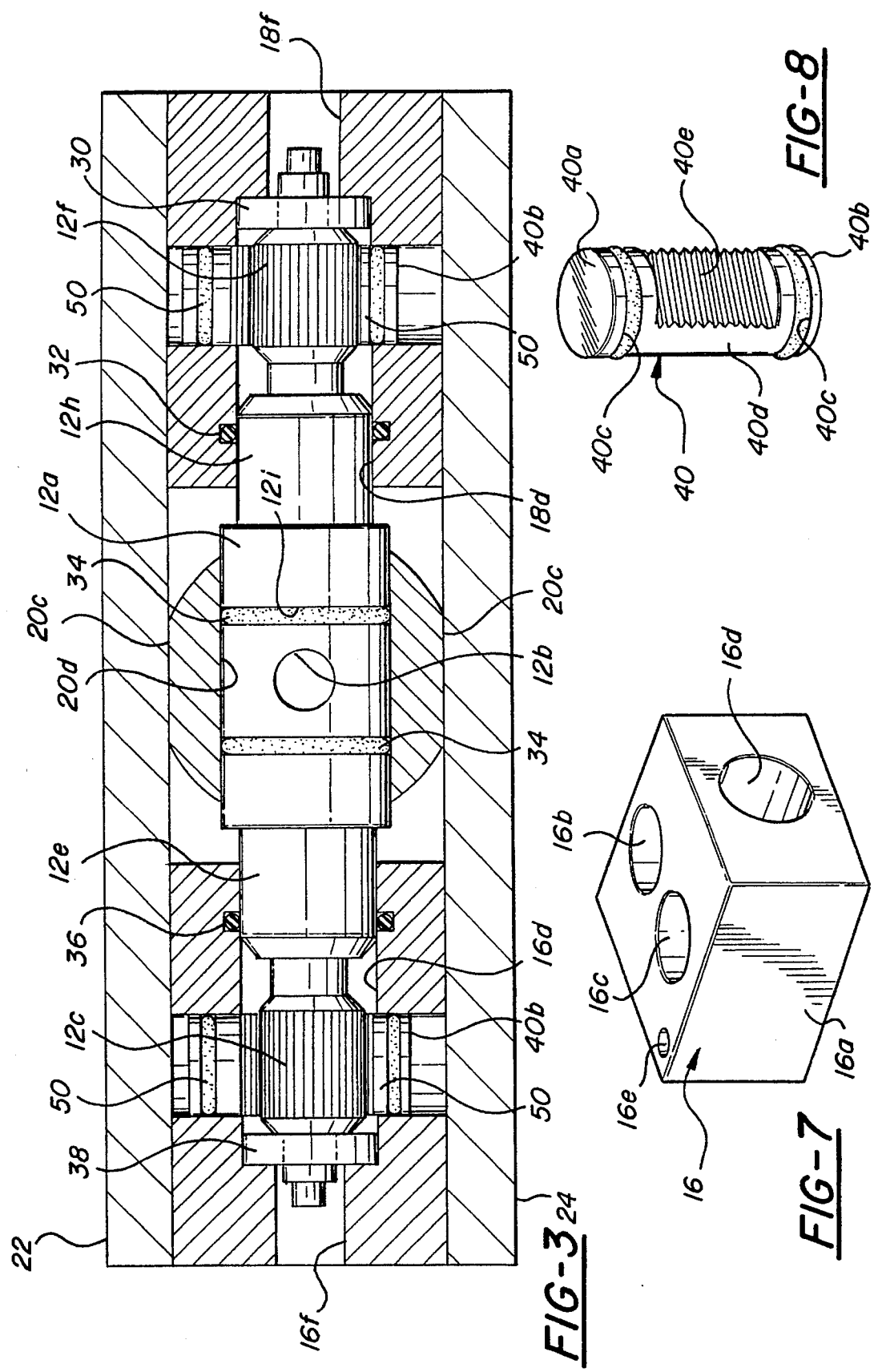

ROTARY SHUT OFF VALVE

BACKGROUND OF THE INVENTION

This invention relates to valves and more particularly to rotary flow control valves.

A rotary flow control valve typically includes a valve body, a passage formed in the valve body for a through flow of a fluid, a valve spool mounted for rotation in the valve body and including a transverse port movable upon rotation of the spool between an open position in which it is aligned with the passage to allow flow through the passage and a closed position in which it is transverse of the passage and the passage is blocked, and means for rotating the spool so as to move the port between its open and closed positions. Various mechanisms have been proposed to rotate the valve spool to accomplish the valving function. Whereas these rotating mechanisms have been generally satisfactory, they have suffered from one or more disadvantages. Specifically, they have been unduly complicated in construction; they have been overly expensive to manufacture; they have not provided a precise valving action; they have required considerable maintenance; they have been relatively short lived especially in hostile environments; they have required a complicated installation procedure with respect to any given hydraulic system in which the valve is being incorporated; or they have required a complicated external piping system to provide the power to achieve the valving function.

SUMMARY OF THE INVENTION

This invention is directed to the provision of an improved rotary valve.

More specifically, this invention is directed to the provision of a rotary valve that is inexpensive, that is simple in construction, that delivers a precise valving action, that requires little maintenance, that is very durable, that is easy to install in any given system, and that eliminates the need for any complicated external piping system.

The rotary shut off valve of the invention is of the type including a valve body including a flow passage; a valve spool mounted for rotation in the valve body, extending generally transverse to the flow passage, and including a transverse port intermediate the spool ends positioned in the flow passage and movable upon rotation of the spool in the valve body between an open position in which it is aligned with the flow passage to allow flow through the passage and a closed position in which it is transverse of the flow passage and the flow passage is blocked; and means for rotating the spool.

According to the invention, the rotating means comprises a first pinion gear at one end of the spool, a second pinion gear at the other end of the spool, and first and second rack means respectively engaging the first and second pinions and operative in response to linear movement of the rack means to rotate the spool to move the spool port between its open and closed positions. This arrangement provides a simple means of moving the spool precisely between its open and closed positions.

According to a further feature of the invention, each of the rack means comprises a pair of racks respectively engaging diametrically opposite sides of the respective pinion gear, and the valve further includes means for moving one rack of each pair in one direction and the other rack of the pair in an opposite direction. The use of rack pairs for coaction with each pinion of the spool provides quick, positive movement of the spool between its open and closed positions.

According to a further feature of the invention, each of the racks comprises a piston defining an annular side wall and having a series of rack teeth formed in the side wall, and each of the pistons is slidably received in a cylinder bore in the valve body. The use of a piston as both the power means and the rack means simplifies valve construction and further facilitates precise movement of the spool between open and closed positions.

According to a further feature of the invention, the valve body includes a left cylinder block on one side of the flow passage defining the cylinder bores receiving the pistons of one rack pair and a right cylinder block on the other side of the flow passage defining the cylinder bores receiving the pistons of the other rack pair. This specific construction provides a simple means of providing the necessary power to move the spool smoothly between its open and closed positions.

According to a further feature of the invention, the valve body further includes a tube positioned between the cylinder blocks and defining the flow passage. This specific construction further facilitates the use of inexpensive, readily machined components to form the valve.

According to a further feature of the invention, the valve body further includes an upper manifold plate overlying the cylinder blocks and the tube and a lower manifold plate underlying the cylinder blocks and the tube, and the manifold plates define fluid passageways for routing fluid to and from the cylinder bores to selectively move the piston in the cylinder bores and selectively rotate the spool. This arrangement provides a simple means for delivering fluid to the cylinder bore and minimizes the need for external piping.

BRIEF DESCRIPTION OF THE DRAWINGS

FIG. 1 is a perspective view of a rotary valve according to the invention;

FIGS. 2, 3, and 4 are cross-sectional views taken respectively on lines 2—2, 3—3, and 4—4 of FIG. 1;

FIGS. 7 and 8 are detailed perspective views of individual valve components.

DETAILED DESCRIPTION OF THE PREFERRED EMBODIMENT

Figure 4:
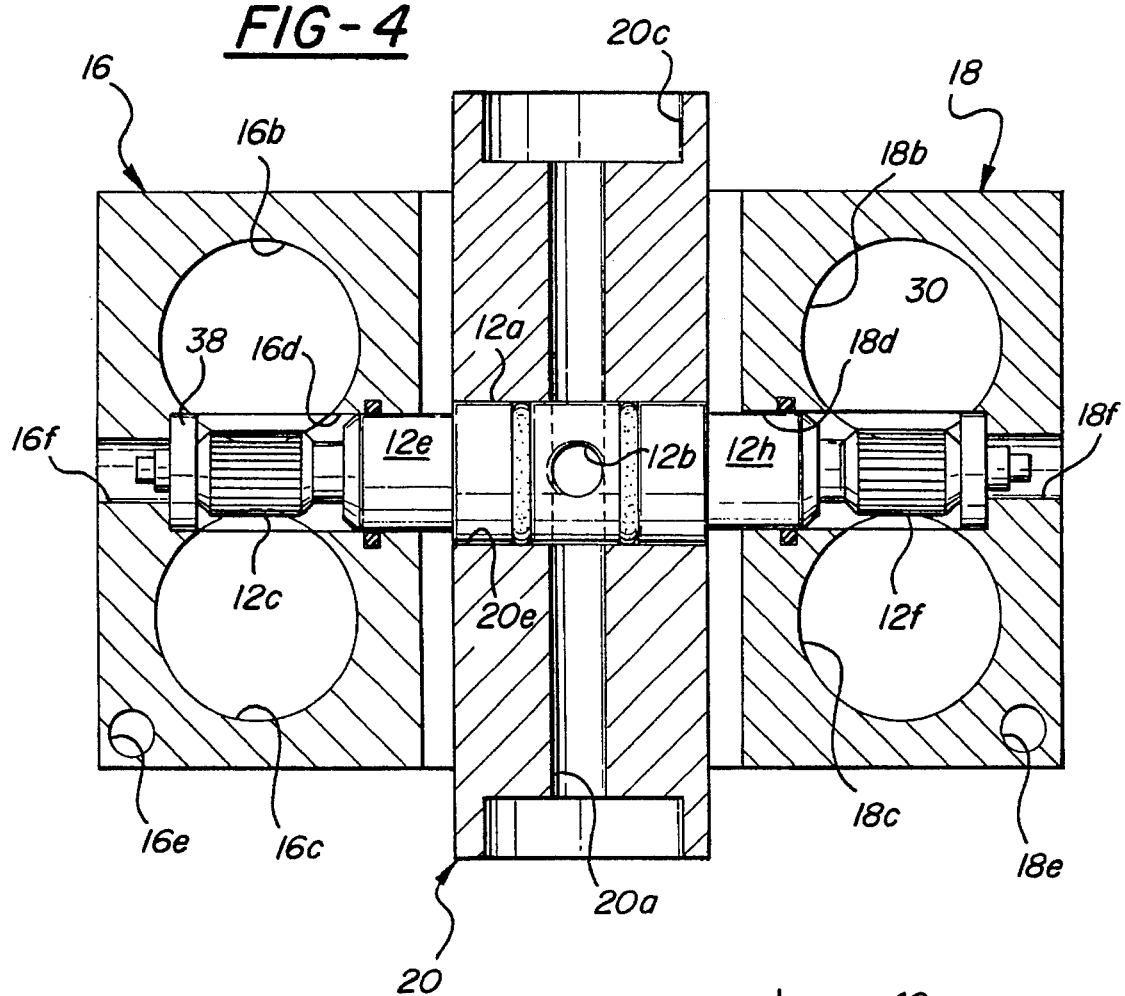
Figure 6:
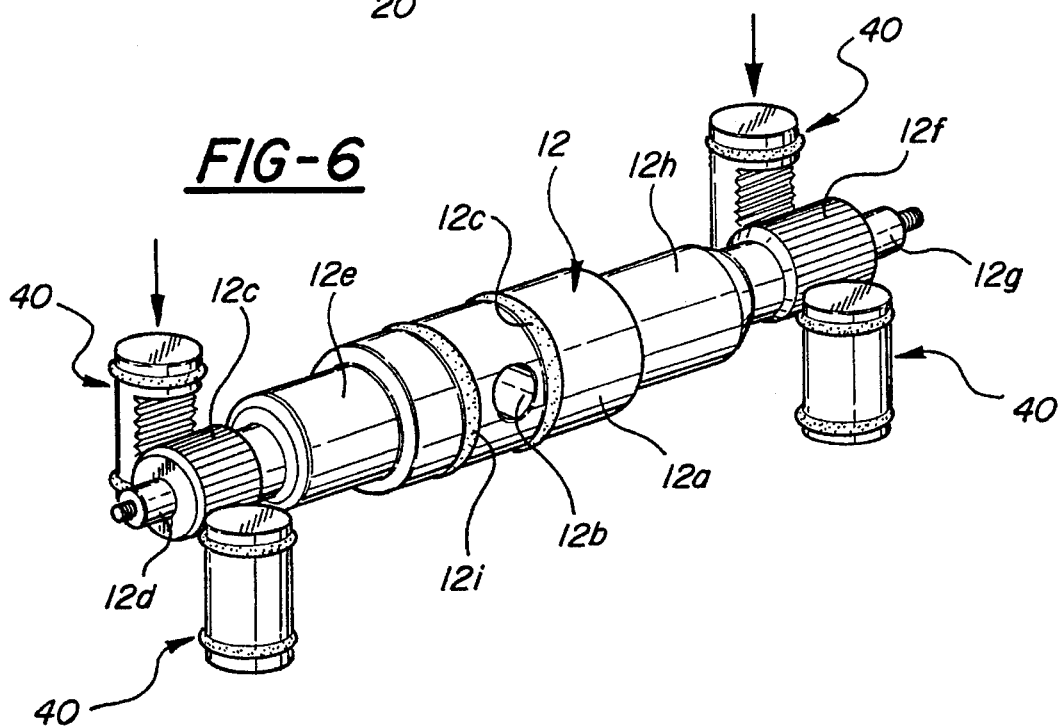
FIG. 6 is an exploded, somewhat schematic, perspective view illustrating the basic operation of the invention rotary valve.
Figure 5:
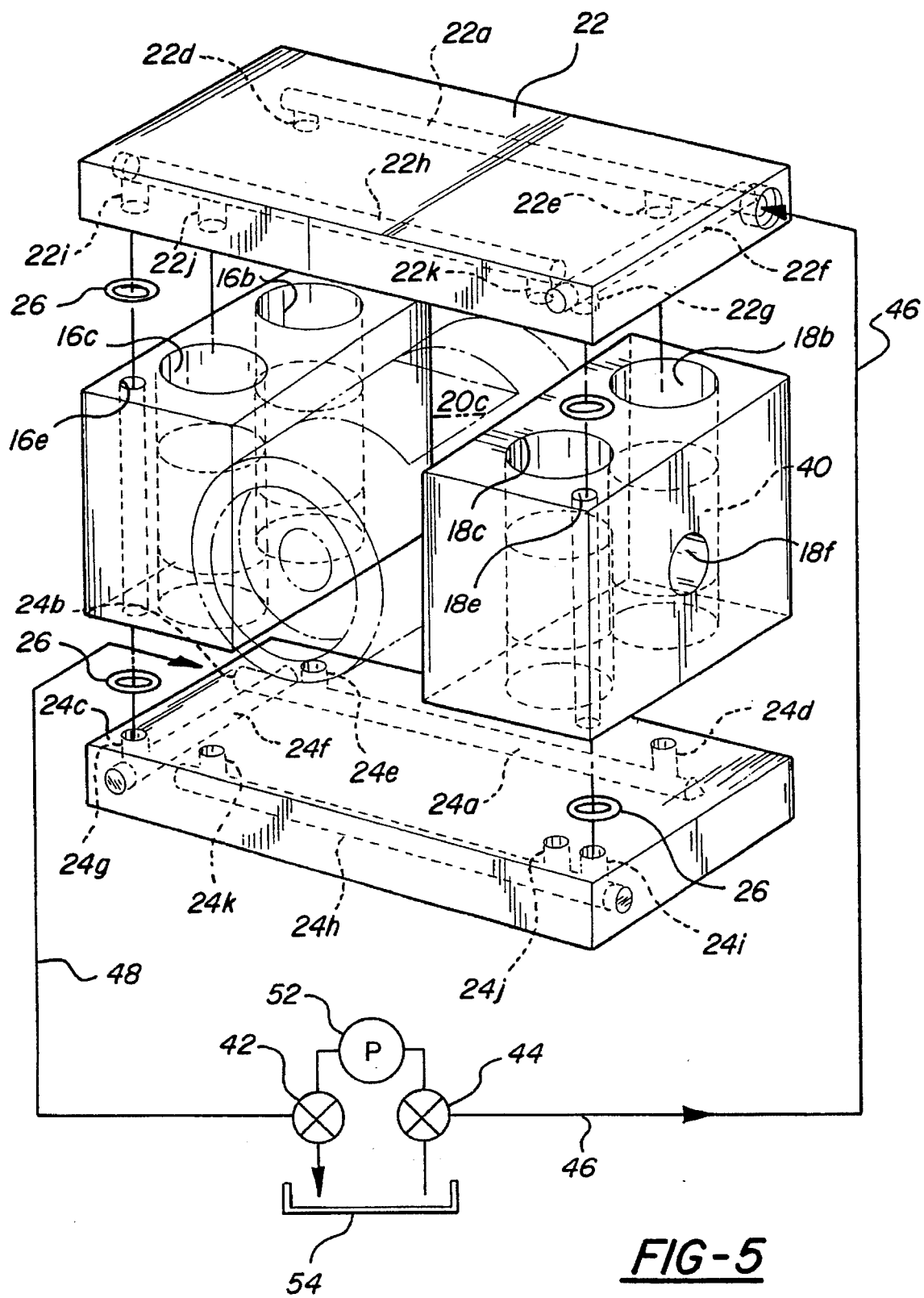
FIG. 5 is an exploded view of the invention rotary valve.

The invention rotary valve, broadly considered, comprises a valve body assembly 10, a spool 12 mounted for rotation in the valve body assembly, and means 14 for rotating the spool within the valve body assembly.

Valve body assembly 10 includes a left cylinder block 16, a right cylinder block 18, a central tube 20, an upper manifold plate 22, and a lower manifold plate 24. In the assembled relation of the parts 16, 18, 20, 22, and 24, tube 20 is positioned centrally between left cylinder block 16 and right cylinder block 18; upper manifold plate 22 is positioned in overlying relation to cylinder block 16 and 18 and tube 20; and lower manifold plate 24 is positioned in underlying relation to cylinder block 16 and 18 and tube 20. The various parts are held in their assembled relationship in known manner utilizing fasteners of known form and all of the valve parts are formed of a suitable ferrous material unless otherwise specified.

Left cylinder block 16 includes a prismatic main body 16a, a pair of parallel, spaced cylinder bores 1b, 16c, a spool passage 16d, a fluid passageway 16e, and an access passage 16f.

Right cylinder block 18 includes a prismatic main body 18a, a pair of cylinder bores 18b, 18c, a spool passage 18d, a fluid passageway 18e, and an access passage 18f.

Tube 20 has a cylindrical configuration and defines a central flow passage 20a extending from one end fitting 20b of the tube to the other end fitting 20c of the tube and sized to carry the fluid whose flow is to be controlled by the invention valve.

Tube 20 has flats 20d formed on its upper and lower faces to provide a large area interface with the upper and lower manifold plates and provide a more secure assembly. Tube 20 further defines a transverse passage 20e extending centrally and transversely through the tube and transversely of flow passage 20a.

Upper manifold plate 22 has a rectangular configuration and defines a network of fluid passageways to facilitate delivery of pressurized oil to the cylinder bores of the cylinder blocks. Specifically, plate 22 defines a transverse passage 22a opening at 22b in end face 22c of the manifold plate and communicating with vertical passageways 22d and 22e; a longitudinal passageway 22f communicating with transverse passageway 22a and with a vertical passageway 22g; and a transverse passageway 22h communicating with vertical passageways 22i, 22j, and 22k.

Lower manifold plate 24 is identical to upper manifold plate 22 but is rotated 180 with respect to upper manifold plate 22. Like upper plate 22, lower plate 24 has a rectangular configuration and defines a network of passageways including a transverse passageway 24a opening at 24b in the manifold plate end face 24c and communicating with vertical passageways 24d and 24e; a longitudinal passageway 24f communicating with passageway 24a and with a vertical passageway 24g; and a transverse passageway 24h communicating with vertical passageways 24i, 24j, and 24k. With the parts in the assembled relationship seen in FIG. 1, passageway 22e opens in the upper end of cylinder bore 18b, passageway 22d opens in the upper end of cylinder bore 16b, passageway 22g communicates with the upper end of passageway 18e; passageway 22k communicates with the upper end of cylinder bore 18c; passageway 22j communicates with the upper end of cylinder bore 16c; passageway 22i communicates with the upper end of passageway 16e; passageway 24e communicates with the lower end of cylinder bore 16b; passageway 24d communicates with the lower end of cylinder bore 18b; passageway 24g communicates with the lower end of passageway 16e; passageway 24k communicates with the lower end of cylinder bore 16c; passageway 24j communicates with the lower end of cylinder bore 18c; and passageway 24i communicates with the lower end of passageway 18e. Elastomeric "O" rings 26 are provided at the fluid passage interfaces between the cylinder blocks and the manifold plates.

Spool 12 has a generally cylindrical configuration and is mounted for rotation within the assembled cylinder blocks and central tube. Spool 12 includes a central main body portion 12a, a central port or passage 12b extending transversely through main body 12a and having a diameter generally corresponding to the diameter of flow passage 20a, a left pinion gear 12c at the left end of the spool, a left journal portion 12d outboard of the left pinion gear, a left seal portion 12e intermediate left pinion gear 12c and main body portion 12a, a right pinion gear 12f, a right journal portion 12g, outboard of pinion gear 12f, and a right seal portion 12h intermediate right pinion gear 12f and main body portion 12a.

In the assembled relation of the spool with respect to the cylinder blocks and the central tube, right journal 12g is mounted in a bearing 30 positioned in bore 18d, right seal portion 12h is journalled in bore 18d in coaction with an elastomeric seal 32, main body portion 12a is journalled in the bore 20d of tube 20 in coaction with elastomeric seals 34 received in seal grooves 12i, left seal portion 12e is journalled in bore 16g in coaction with an elastomeric seal 36, and left journal portion 12d is received in a bearing 38 positioned in bore 16g. As will be understood, rotation of spool 12 within tube 20 moves spool port 12b between an open position in which it is aligned with flow passage 20a in tube 20 to allow the free flow of fluid through flow passage 20a and a closed position, 90 degrees from the open position, in which the main body 12a of the spool blocks flow passage 20a to preclude flow of fluid through flow passage 20a.

The means 14 for rotating the spool between its open and closed position includes a plurality of piston racks 40, control valves 42 and 44, and control lines 46 and 48.

Each piston rack 40 has a generally cylindrical configuration and is sized to fit slidably within a respective cylinder bore in one of the cylinder blocks 16, 18. Each piston rack includes an upper face 40a, a lower face 40b, upper and lower piston seal grooves 40c, an annular side wall 40d, and a series of vertically spaced rack teeth 40e formed in the side wall 40d and sized to meshingly engage with the teeth of a respective one of the pinion gears 12c, 12f. A piston rack 40 is slidably and sealingly received in each cylinder bore 18b, 18c, 16b, 16c in coaction with piston ring seals 50 and with the rack teeth 40e in meshing engagement with a respective pinion gear 12c, 12f. The piston racks are arranged in pairs with a first pair disposed in cylinder bore 16b and 16c and meshingly engaging pinion gear 12c at diametrically opposed locations on the pinion gear and with a second pair received in cylinder bores 18b, 18c and meshingly engaging pinion gear 12f at diametrically opposed locations on that gear.

Control line 46 communicates with passageway inlet opening 22b, control line 48 communicates with passageway inlet opening 24b, control valve 44 selectively communicates control line 46 with a source of pressurized oil 52 and a reservoir 54, and control valve 42 selectively communicates control line 48 with pressure source 52 and reservoir 54.

It will be understood that the invention rotary valve functions to selectively allow flow of fluid through flow passage 20a and preclude flow of fluid through passage flow 20a by selective rotation of spool 12 to bring spool port 12b into and out of alignment with flow passage 20a. The selective back and forth rotation of the valve spool between its open and closed positions is accomplished by selective reciprocal movement of piston racks 40 in their respective cylinder bores with one rack of each pair moving downwardly and the other rack of the pair simultaneously moving upwardly so that, at each end of the spool, two piston racks are moving in opposite directions to positively rotate the respective end of the spool.

The movement of the piston racks in the cylinder bores is controlled by control valves 42, 44. In one operational mode of the valve, control valve 44 directs pressurized oil through control line 46 to inlet 22b while control valve 42 exhausts oil from inlet 24b via control line 48. The pressurized oil flowing through control line 46 is routed, via the passageways in the upper and lower manifold plates and the coacting passageways in the cylinder blocks, to the upper face of the piston racks in bores 16b and 18b and to the lower face of the piston racks in bores 16c and 18c while oil is exhausted via control line 48 from the lower face of the piston racks in bores 18b and 16b and the upper face of the piston racks in cylinder bores 16c and 18c. This action has the effect of rotating the valve spool in a clockwise direction as viewed in FIG. 2.

Conversely, control valves 42 and 44 may be reversed to direct pressurized oil through control line 48 while exhausting oil through control line 46. In this mode, pressurized oil is directed to the lower face of the piston racks in bore 16b and 18b and to the upper face of the piston racks in bores 16c and 18c while oil is exhausted via line 46 from the lower face of the piston racks in cylinder bores 16c and 18c and from the upper face of the piston racks in cylinder bores 18b and 16b, whereby to produce a counterclockwise rotation of the valve spool as viewed in FIG. 2.

It will be seen that the rotational movement of the valve spool between its open and closed position is at all times controlled by the positive pressure-actuated movement of four piston racks with a pair of piston racks engaging each end of the spool and with the piston racks in each pair moving in opposite directions and engaging diametrically opposed locations on the respective pinion gear. The movement of the valve spool between its open and closed positions is thus firm, positive, and quick. Further, since the forces acting on the spool to accomplish the rotational movement of the spool are at all times counterbalanced by oppositely acting forces, the valve mechanism undergoes little or no stress during its operation with the result that the valve is long lasting and requires very little maintenance. Further, since the manifold plates provide substantially all of the piping required to operate the valve, the valve is easy to install and requires a minimum of external control piping.

Whereas a preferred embodiment of the invention has been illustrated and described in detail, it will be apparent that various changes may be made in the disclosed embodiment without departing from the scope or spirit of the invention.

I claim:

1. A rotary shut off valve comprising:

a valve body defining a flow passage;

a valve spool mounted for rotation in the valve body, extending generally transverse to the flow passage and including one end at one side of the flow passage, another end at an opposite side of the flow passage, a first pinion gear at said one end of the spool, a second pinion gear at said other end of the spool, and a port intermediate the spool ends positioned in the flow passage and movable upon rotation of the spool in the valve body between an open position in which it is aligned with the flow passage to allow flow through the flow passage and a closed position in which it is transverse of the flow passage and the flow passage is blocked; and first and second rack means respectively engaging said first and second pinions and operative in response to linear movement of the rack means no rotate the spool to move the port between its open and closed position;

each of the rack means comprising a pair of racks respectively engaging diametrically opposite sides of the respective pinion gear;

the valve further including means for one rack of each pair in one direction while moving the other rack of the pair in an opposite directions whereby to provide oppositely acting counter-balancing forces on each of the pinion gears to reduce spool stress and increase valve life.

2. A valve according to claim 1 wherein:

each of the racks comprises a piston defining an annular side wall and having a series of rack teeth formed in the side wall; and each of the pistons is slidably received in a cylinder bore in the valve body.

3. A valve according to claim 2 wherein the valve body includes a left cylinder block on one side of the flow passage defining the cylinder bores receiving the pistons of one rack pair and a right cylinder block on the other side of the flow passage defining the cylinder bores receiving the pistons of the other rack pair.

4. A valve according to claim 3 wherein the valve body further includes a tube positioned between the cylinder blocks and defining the flow passage.

5. A valve according to claim 4 wherein the valve body further includes an upper manifold overlying the cylinder blocks and the tube and a lower manifold plate underlying the cylinder blocks and the tube.

6. A valve according to claim 5 wherein the manifold plates define fluid passageways for routing control fluid to and from the cylinder bores to selectively move the pistons in the cylinder bores and selectively rotate the spool.

7. A rotary shut off valve comprising a valve body defining a flow passage; a valve spool mounted for rotation in the valve body, extending generally transverse to the flow passage, having one end at one side of the flow passage and another end at an opposite side of the flow passage, and including a port intermediate the spool ends, positioned in the flow passage, and movable upon rotation of the spool in valve body between an open position in which it is aligned with the flow passage to allow flow through the flow passage and a closed position in which it is transverse of the flow passage and the flow passage is blocked; and means for rotating the spool, characterized in that:

the rotating means comprises a first pinion gear at said one end of the spool, a second pinion at said other end of the spool, and first and second rack means respectively engaging said first and second pinions and operative in response to linear movement of the rack means to rotate the spool to move the spool port between its open and closed positions;

each of the rack means comprises a pair of racks respectively engaging diametrically opposite sides of the respective pinion gear; and the valve further includes means for moving one rack of each pair in one direction while moving the other rack of the pair in an opposite direction, whereby to provide oppositely acting counter-balancing forces on each of the pinion gears to reduce spool stress and increase valve life.

8. A valve according to claim 7 wherein:

the valve body defines a plurality of cylinder bores; and each of the racks comprises a piston mounted for reciprocal movement in a respective cylinder bore and having a series of rack teeth formed in a side wall of the piston for engagement with a respective pinion gear.

9. A valve according to claim 8 wherein the valve further includes fluid delivery means operative to deliver fluid to the cylinder bores in a sense to move one piston of each pair in one direction while moving the second piston of the pair in an opposite direction.

10. A valve according to claim 9 wherein the fluid delivery means comprises passageways in the valve body communicating with the cylinder bores and control valve means for selectively controlling the delivery of pressurized fluid to the passageways.

11. A rotary shut-off valve comprising:

a valve body defining a flow passage;

a valve spool mounted for rotation in the valve body, extending generally transverse to the flow passage, and including one end at one side of the flow passage, another end at an opposite side of the flow passage, a first pinion gear at said one end of the spool, a second pinion gear at said other end of the spool, and a port intermediate the spool ends positioned in the flow passage and moveable upon rotation of the spool in the valve body between an open position in which it is aligned with the flow passage to allow flow through the flow passage and a closed position in which it is transverse of the flow passage and the flow passage is blocked; and first and second rack means respectively engaging said first and second pinions and operative in response to linear movement of the rack means to rotate the spool to move the port between its open and closed positions;

each of the rack means including a piston defining an annular series of rack teeth formed in the side wall;

the valve body including a first modular cylinder block on one side of the flow passage defining a cylinder bore glideably receiving the piston of one rack means and a second cylinder block on the other side of the flow passage defining a cylinder bore slideably receiving the piston of the other rack means;

the valve body further including a modular tube positioned between the modular cylinder block, defining the flow passage therein, and defining a transverse passage for receiving at least a portion of said valve spool for aligning the intermediate port with the flow passage during rotation of the valve spool; and the valve body further including an upper manifold plate overlying the cylinder blocks and the tube and a lower manifold plate underlying the cylinder blocks and the tube.

\* \* \* \* \*

UNITED STATES PATENT AND TRADEMARK OFFICE
CERTIFICATE OF CORRECTION

PATENT NO. : 5,494,254
DATED : February 27, 1996
INVENTOR(S) : John Dominka

It is certified that error appears in the above-indentified patent and that said Letters Patent is hereby corrected as shown below:

Column 3, Line 4, delete "1b" and insert -- 16b --.
Column 3, Line 33, delete "180" and insert --180 degrees--.
Column 4, Line 3, delete "12g," and insert --12g--.
Column 4, Line 13, delete "16g" and insert --16d--.
Column 4, Line 15, delete "16g" and insert --16d--.
Column 5, Line 62, delete "no" and insert --to--.
Column 6, Line 1, delete "means for one" and insert --means for moving one--.
Column 6, Line 35, delete "valve body" and insert --the valve body--
Column 8, Line 2, delete "annular series of" and insert --annular side wall and having a series--.
Column 8, Line 5, delete "glideably" and insert --slideably--.

Signed and Sealed this

Sixteenth Day of July, 1996

Attest:

BRUCE LEHMAN

Attesting Officer

Commissioner of Patents and Trademarks